United States Patent [19]
Gunnarsson

[11] 3,793,142
[45] Feb. 19, 1974

[54] NUCLEAR REACTOR HAVING MEANS FOR CLAMPING A STEAM TREATING UNIT

[75] Inventor: Christer Gunnarsson, Vasteras, Sweden

[73] Assignee: Aktiebolaget Asea-Atom

[22] Filed: Sept. 14, 1972

[21] Appl. No.: 289,131

[30] Foreign Application Priority Data
Oct. 11, 1971 Sweden.............................. 12818/71
Apr. 14, 1972 Sweden.......................... 4860/72

[52] U.S. Cl..................................... 176/55, 176/87
[51] Int. Cl............................................. G21c 15/16
[58] Field of Search ..................... 176/54, 55, 56, 87

[56] References Cited
UNITED STATES PATENTS
3,331,747  7/1967  Williamson ........................... 176/54
3,625,819  12/1971  Sodergard............................. 176/54
3,066,088  11/1962  Blaser................................... 176/54

Primary Examiner—Harvey E. Behrend

[57] ABSTRACT

In a nuclear reaction which includes a reactor tank with a lid and a steam treating unit including a moderator tank lid with steam separators attached to it and a steam drying unit arranged above the lid of the moderator tank, in order to clamp the steam treating unit members are secured in the lid of the reactor tank which exert a pressure on the steam treating unit and press it against the moderator tank when the lid is applied on the reactor tank. These members may be elastically deformable beams fixed on the ends to the reactor tank lid and arranged in a polygonal formation for exerting a clamping pressure during steam treating which is greater than the forces which may arise from a normal type of accident.

12 Claims, 12 Drawing Figures

III-III

NUCLEAR REACTOR HAVING MEANS FOR CLAMPING A STEAM TREATING UNIT

BACKGROUND OF THE INVENTION

1. Field of the Invention

The present invention relates to an arrangement in a nuclear reactor for clamping the steam treating unit of the reactor, this consisting primarily of a moderator tank lid with steam separators attached thereto and a steam dryer unit.

2. The Prior Art

It is extremely desirable in the operation of a nuclear reactor to be able to perform an exchange of fuel as quickly as possible, as such an exchange among other things causes shut-downs. Among the most time-consuming operations are dismantling and assembling the steam dryer unit and the lid of the moderator tank with the individual steam separators. The steam dryer unit is separated from the moderator tank lid because it is desirable to inspect the steam separators at regular time intervals.

SUMMARY OF THE INVENTION

By means of a device according to the present invention, it will be possible to shorten the time for fuel exchange by up to 30 hours. The arrangement according to the present invention is characterised by the fact that, in a nuclear reactor having a reactor tank with a tank lid and a steam treating unit which includes a moderator tank lid having steam separators attached thereto and a steam dryer unit is arranged above the lid of the moderator tank. In order to clamp the steam treating unit, elastically deformable beams are secured in the lid of the reactor tank for exerting a pressure on the steam treating unit for pressing it against the moderator tank when the lid is applied on the reactor tank. The beams are arranged in a polygon and have greater cross-section in their central portions than in their ends.

The three main operations of a fuel exchange cycle consist of: 1. dismantling of the reactor tank lid, 2. dismantling of the steam dryer unit, and 3. dismantling of the moderator tank lid with steam separators, and the cycle is the other way around when assembling.

With the help of the present arrangement, operations 2 and 3 can now be carried out at the same time. This allows mechanical screw joints to be omitted, and this means a time saving of 97 percent for operations 2 and 3. The device according to the invention also enables the steam dryer unit to be lifted separately from the steam treating unit.

In addition to this, another advantage is achieved, namely that a previously necessary screw joint located between the moderator tank and the moderator tank stand about 25 m down in the reactor tank may be partially or fully omitted, as the clamping force generated by means of the device according to the invention is sufficient also for this clamping.

BRIEF DESCRIPTION OF THE DRAWINGS

The arrangement according to the invention will be further described with reference to the accompanying drawings, in which.

DESCRIPTION OF THE PREFERRED EMBODIMENTS

Figure 1:
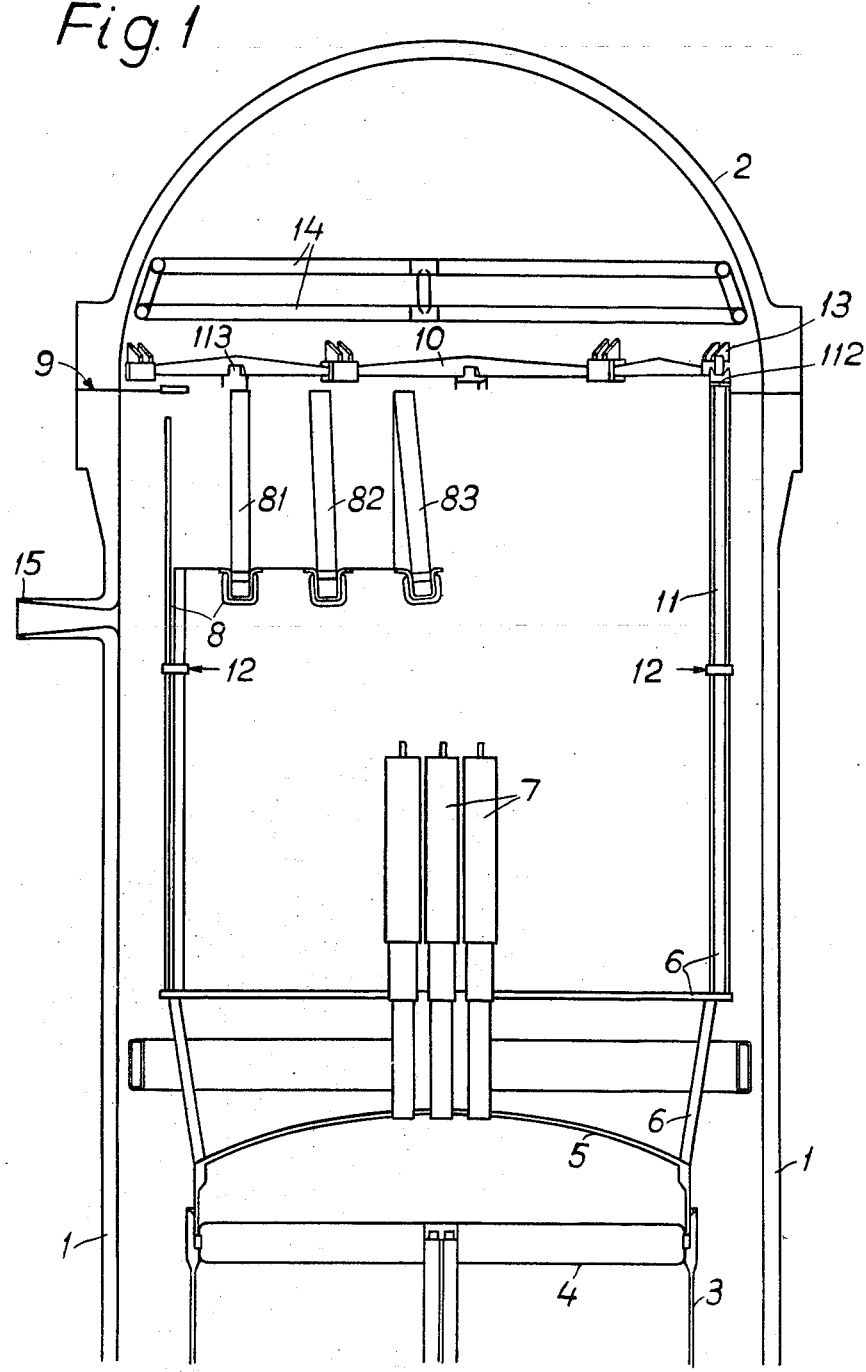
FIG. 1 shows the upper part of a reactor tank partially in section with the steam treating unit clamped with the help of a device according to the invention.
Figure 2:
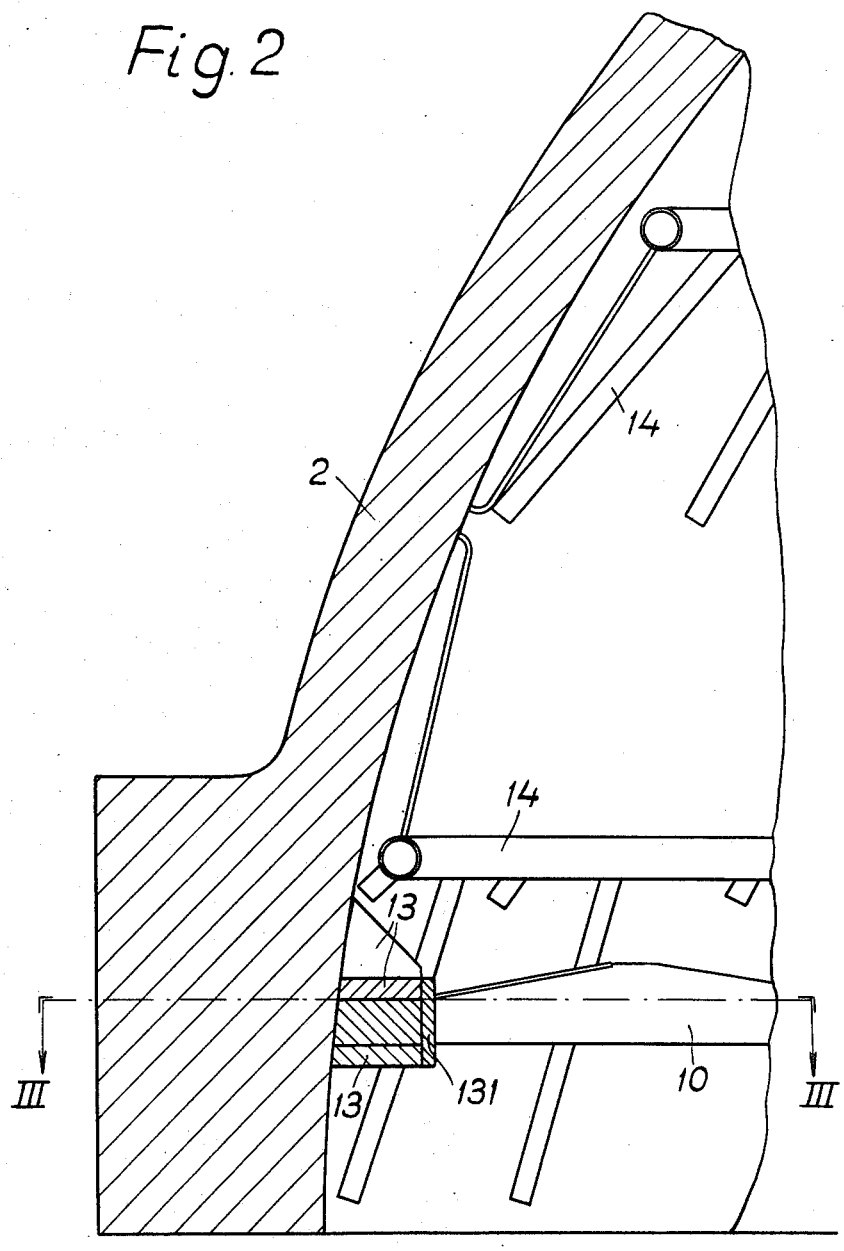
FIG. 2 shows a cross-section on the line II—II in FIG. 3.
Figure 3:
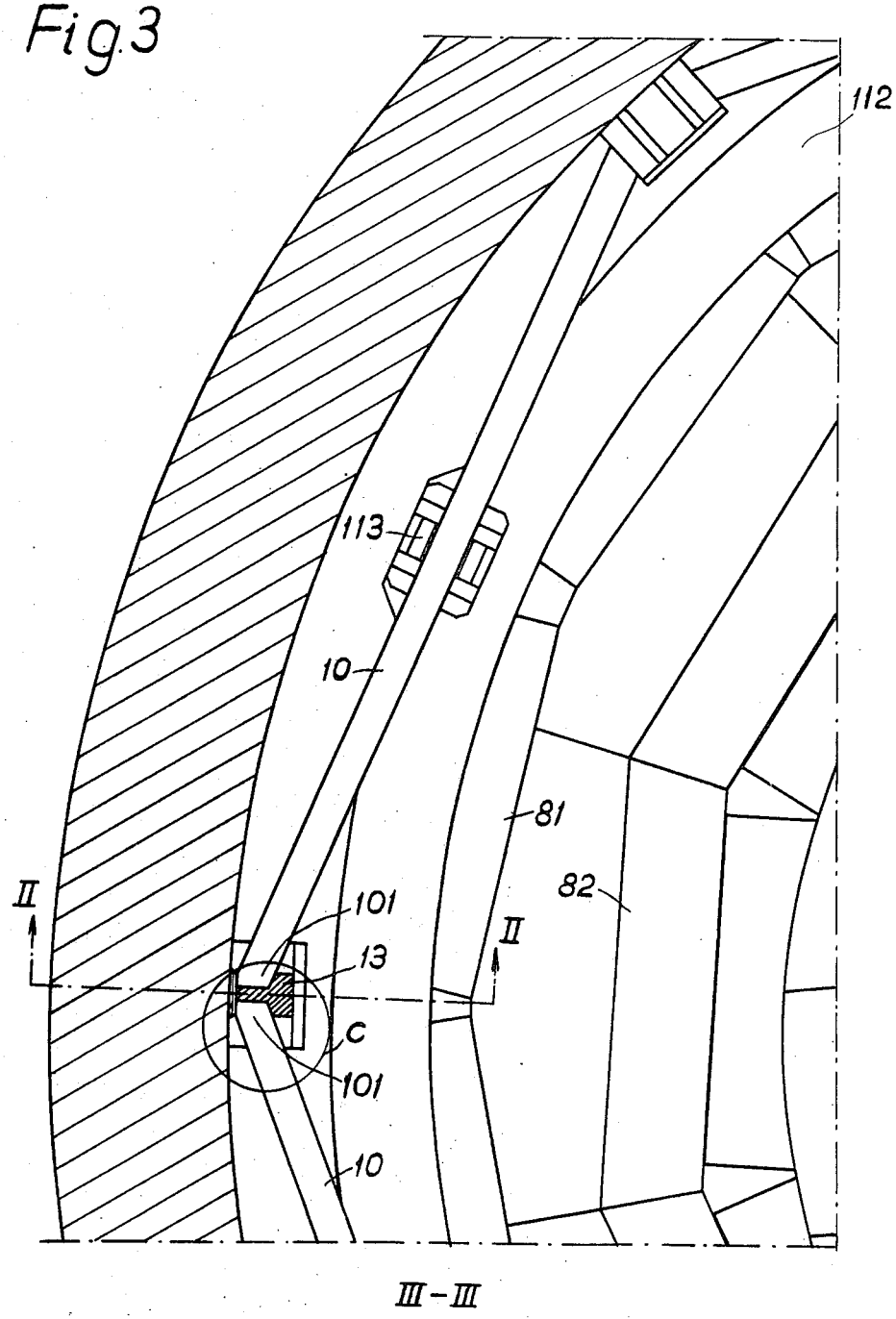
FIG. 3 shows a cross-section on the line III—III in FIG. 2.
Figure 4:
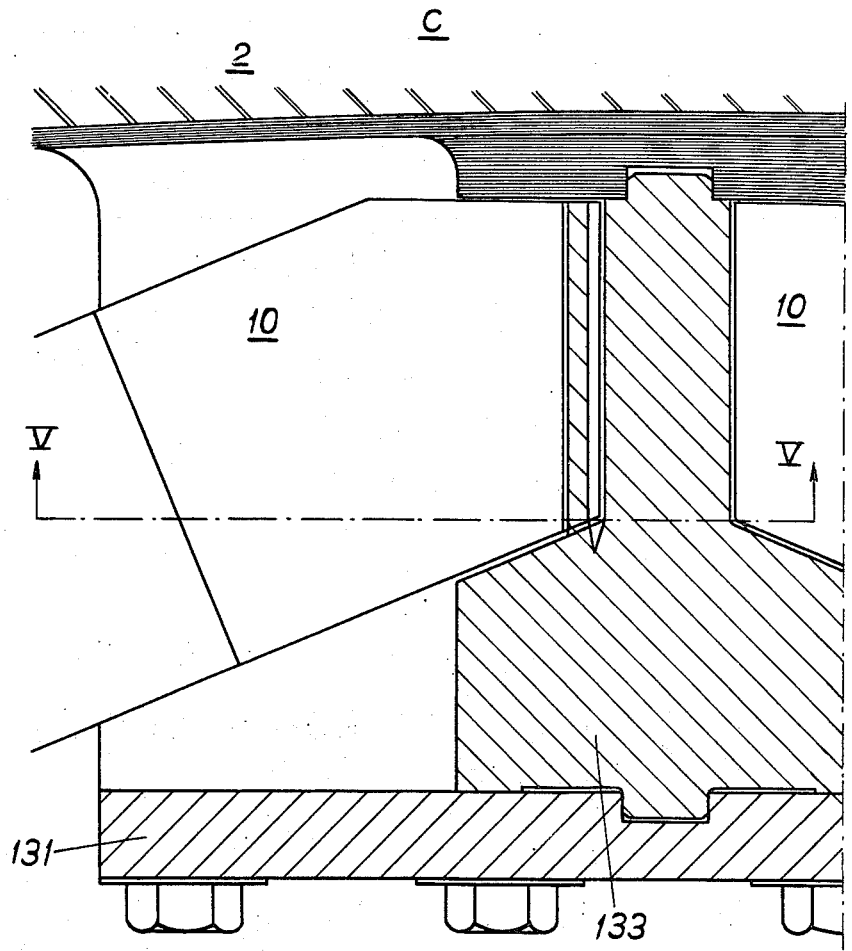
FIG. 4 shows detail C in FIG. 3.
Figure 5:
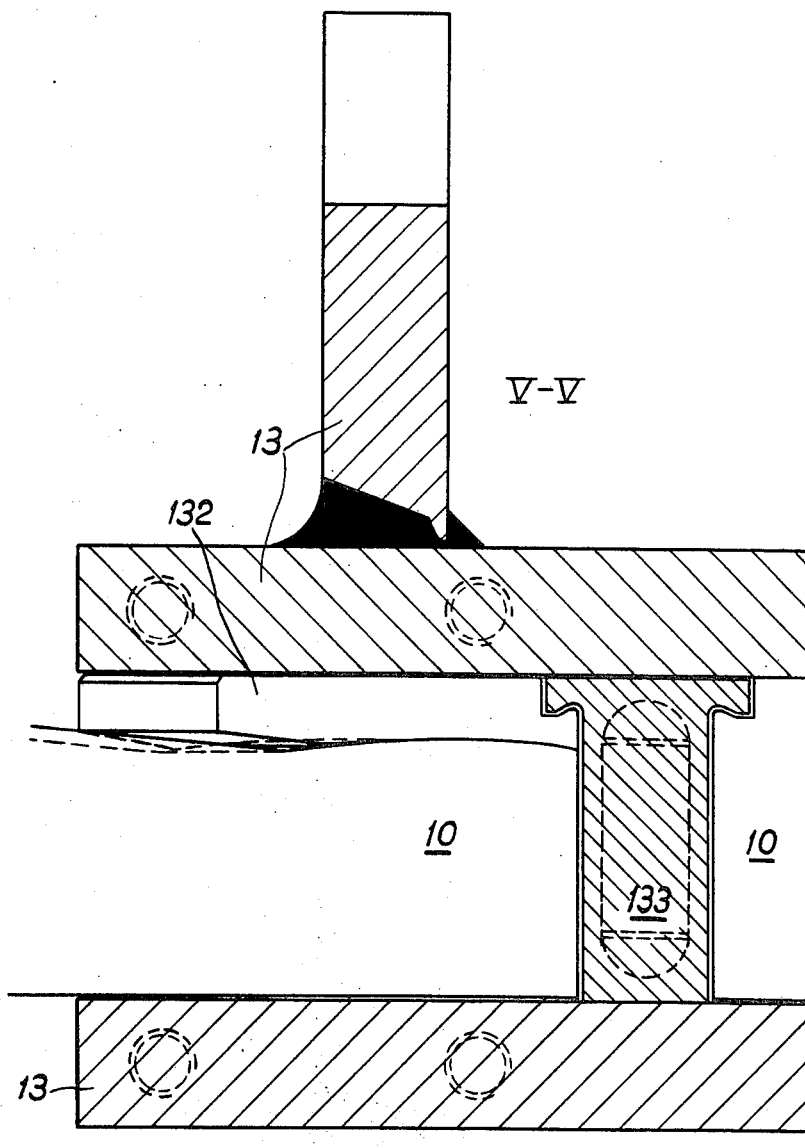
FIG. 5 shows a cross-section on the line V—V in FIG. 4.

In FIG. 1 is shown the upper part of a reactor in partial section. The outside consists of a reactor tank 1 with reactor tank lid 2. Inside the reactor tank 1 is located a moderator tank 3 which comprises the reactor core (not shown) and above the reactor core a core grid 4. The moderator tank 3 has an upper closure constituted by a moderator tank lid 5 with an annular support 6. On and extending through the moderator tank lid 5 steam separators 7 are arranged, of which only a few are shown in the drawings. Above the annular support 6, the steam dryer unit 8 is arranged with steam dryer elements 81, 82 and so on. Only part of the stem dryer elements are shown in the drawings.

In the reactor tank lid 2 horizontal beams 10 are arranged, generally in a polygon. These beams 10 are enclosed along with the upper surface of the steam dryer unit 8 when the reactor tank lid 2 is applied to the tank. The thrusts from the beams 10 are conveyed to vertical columns 11 (see FIG. 6), which form a part of the steam dryer 8. The upper ends of the columns 11 are connected to each other by means of a ring 112. On the ring 112 forks 113 are arranged. If a technical difficulty should occur in the steam pipe, 15, the steam dryer unit 8 will be exposed to a depression at the point of rupture. This depression causes a radial force which works on the steam dryer unit 8, the moderator tank lid 5, and the moderator tank 3. This radial force will be taken up mainly by the thrust of the beams 10 multiplied by the prevailing friction coefficient. Since the friction coefficient is difficult to calculate, the steam dryer unit 8 is allowed to slide until the forks 113 engage the beams 10. The motive energy arisen through the sliding is taken up by the beams 10.

Beams 10 are attached at their ends to the reactor tank lid 2. The steam dryer unit 8 may be connected by means of a bolt joint at position 12 in FIG. 1 to the moderator tank lid 5 or may be placed above the moderator tank lid without a locking joint.

In the reactor tank lid 2 a cooling system 14 is also arranged.

In FIGS. 2–5 are shown how the beams are attached in a suitable manner to the reactor tank lid 2.

The ends 101 of the beams 10 rest on supports 13, which are welded to the inside of the reactor tank lid 2 and the construction of which is clear from FIGS. 2, 3, 4, and 5. An end piece 131 is secured by bolts to the supports 13, in order to allow dismantling and service of the beams 10 and their attachment ends 101, if necessary. In order to reduce the specific surface pressure between the beams 10 and the supports 13 upon elastic deformation of the beams 10, rounded plates 132 are positioned between the beam ends 101 and the supports 13. The two beam ends 101 rest on each support 13 and are separated by a locking boss 133 fixing each beam end 101 in its correct position.

Figure 6:
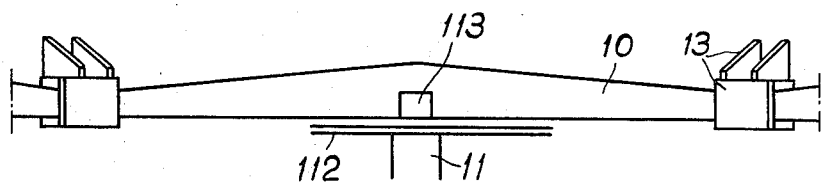
FIG. 6 shows an advantageous embodiment of the beams of the polygon arrangement according to the invention.

In FIG. 6 an advantageous embodiment of a beam 10 is shown having greater cross-sectional area in its central section. This embodiment is better adapted to the strain on the beams and to the elastic constant desired.

Figure 7:
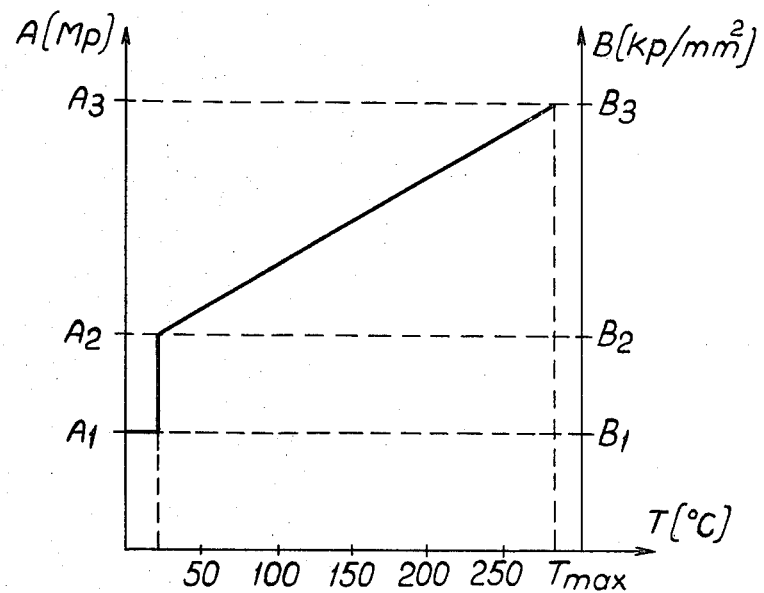
FIG. 7 shows a diagram in which the clamping force of the steam treating unit and the stress of the beams are shown as a function of the temperature.

FIG. 7 shows a diagram describing clamping force for the steam treating unit, A (Mp), and strain on the beams, B (kp/mm$^2$), as a function of the temperature T (°C). In connection with this figure the operation of the arrangement according to the invention will be described.

Moderator tank lid 5 (with annular support 6 and steam separators 7) and steam dryer unit 8 (joined with bolt joint at 12 or not) are placed unattached on the moderator tank 3 (the reactor tank lid 2 of course being dismantled). This steam treating unit (moderator tank lid 5 with annular support 6 and steam separators 7 and steam dryer unit 8 with column 11) thus causes a pressure on the moderator tank 3 through the core grid 4, said pressure being determined by the dead weight $A_1$ of the steam treating unit and the strain on the beams being $B_1$, where $B_1 = 0$.

After that, the reactor tank lid 2 with the beams 10 are mounted, the distance between the steam dryer unit 8 and the beams 10 being such that the beams 10 are elastically deformed, that is a certain initial pressure is applied. This deformation force is transmitted to the steam treating unit and forms together with the dead weight clamping force $A_2$ for this unit, $A_2 \approx 2A_1$, a strain $B_2$ having been applied to the beams 10. These two operations are carried out as a rule at ambient temperature $T = +20°C$.

Now the reactor can be put into operation, that is, the temperature T increases, and this means that the parts of the steam treating unit and the reactor tank 1 expand, but the reactor 1 is made of so called "black material," carbon steel, and the internal parts are suitably made of stainless material, the thermal coefficient of linear expansion for the internal parts being greater than the corresponding coefficient for the reactor tank and the inner parts of the reactor tank expanding more than the reactor tank itself. This means that the clamping force A increases with the temperature T to a maximum value $A_3$, slightly below +300°C, for maximum operation temperature $\overline{T}$ max., where $A_3 \approx 4A_1$. The strain B on the beams 10 has thus reached a value $B_3 \approx 3B_2$. The clamping force $A_3$ and the strain $B_3$ are greater than the greatest force or strain arising because of normal types of accidents, such as a rupture in the steam pipe.

The reactor tank lid 2 is also made of black material and the beams 10 of stainless material, and this means that the beams 10 expand more than the tank lid, because of differences in the coefficients of linear expansion. When the beams 10 are deformed as above from $A_2$ to $A_3$, a sliding motion arises at the supporting ends 101 of the beams 10, and the original length of the beams 10 is reduced. When the beams 10 expand, because of thermal differences, and are reduced by deformation, the sliding motion at the supporting points can be minimized. The advantage derived by minimizing the sliding is that the force $A_3$ times the coefficient of friction gives a frictional force, and the frictional force is favorably affected.

When exchanging the fuel, the reactor tank lid 2 is dismantled and placed in the reactor room. The beams 10 are thus easily available for inspection and service if necessary.

Figure 8:
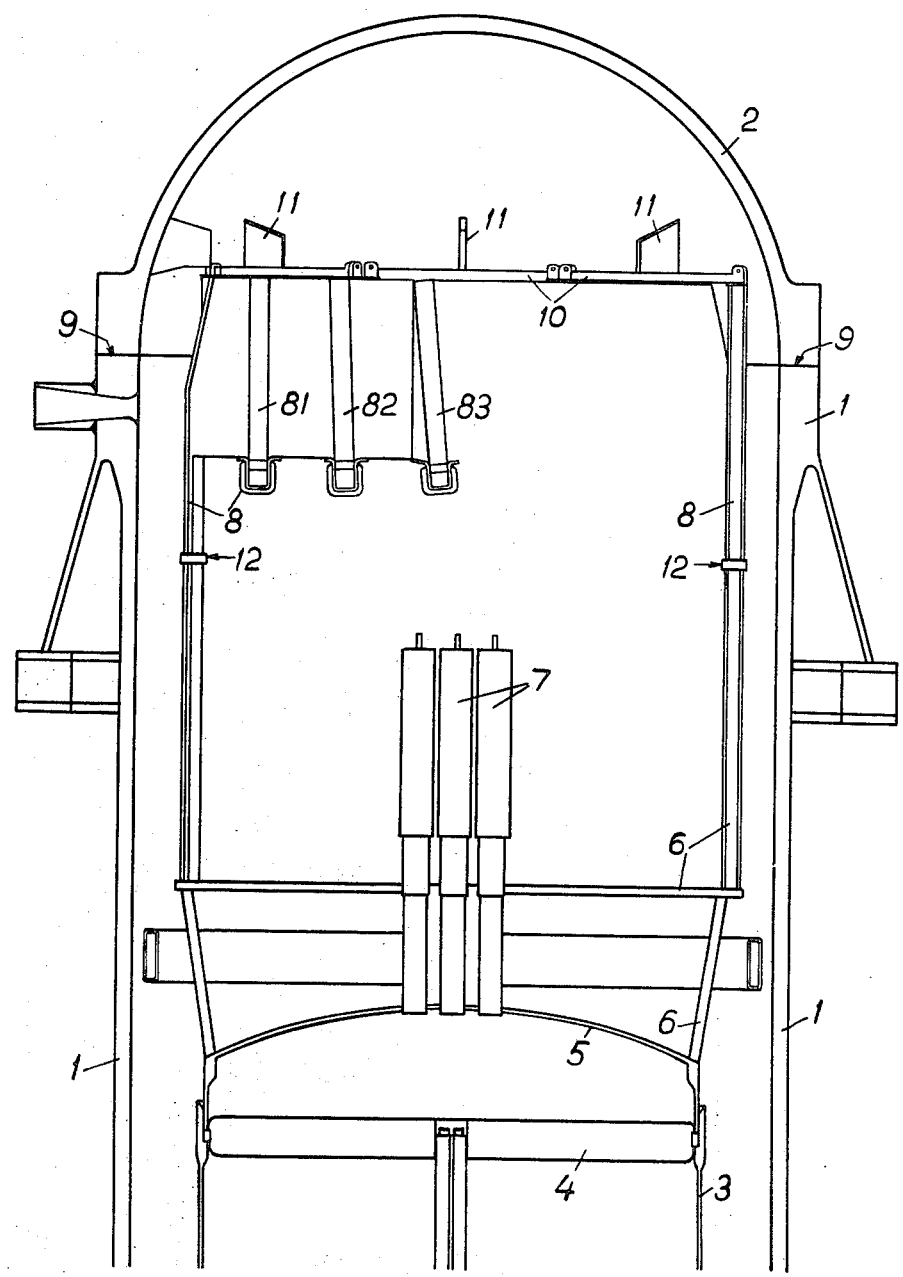
FIG. 8 shows an alternative embodiment of the arrangement according to the invention, applied in a reactor tank.

FIG. 8 shows an alternative solution to that described above. Here, the steam dryer unit 8 has such a vertical extent that it passes the dividing level 9 vertically between the reactor tank 1 and the reactor tank lid 2. Above the steam dryer unit 8, horizontal beams 10 are arranged, preferably in a polygon formation. These beams 10 are affected in their central sections by the stop 11 in the reactor tank lid 2. The beams 10 are fixed at the ends to the steam dryer unit 8. The steam dryer unit 8 can either be connected to the moderator tank lid 5 by means of a bolt joint at position 12 in FIG. 1 or be placed above the tank lid with no locking joint.

Figure 9:
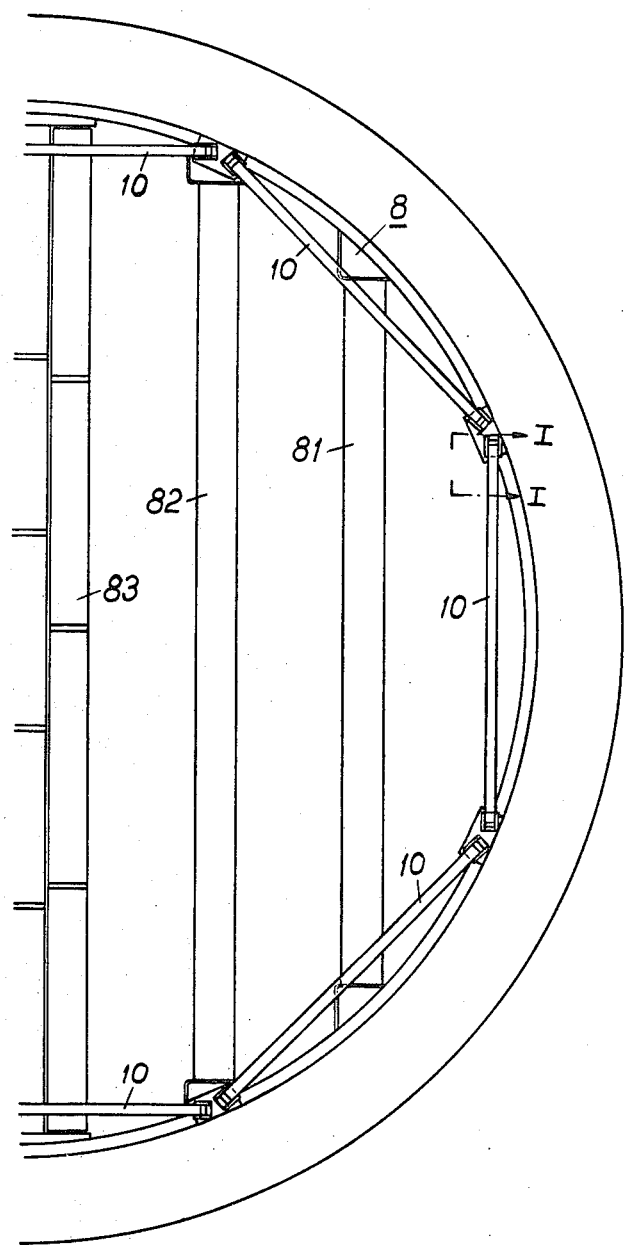
FIGS. 9–12 shows details of this alternative embodiment, FIG. 10 being a cross-section on the line I—I of FIG. 9.

FIG. 9 shows from above (without reactor tank lid 2) how the beams 10 are supported above the steam dryer unit 8.

Figure 10:
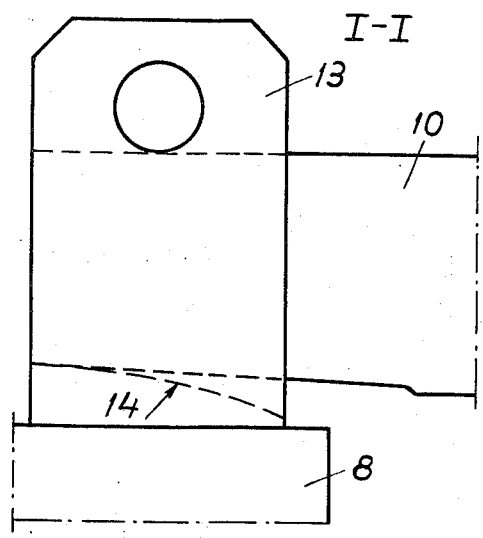

FIG. 10 is a section along the line I—I in FIG. 9 showing how the connection between a beam 10 and the steam dryer unit 8 can be achieved. The end of the beam 10 rests in a U-shaped holder 13 attached to the steam dryer unit 8, the bottom surface being preferably spherical as is shown in exaggeration by the broken line in the figure.

Figure 11:
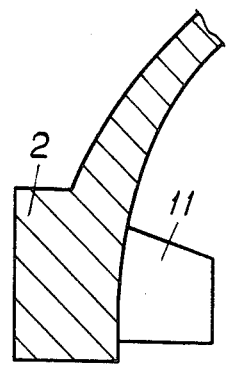

FIG. 11 shows an advantageous shape of the beam 10 having greater cross-sectional area in its central section. This construction is better adapted to the strain on the beams 10 and to the elastic constant desired.

Figure 12:
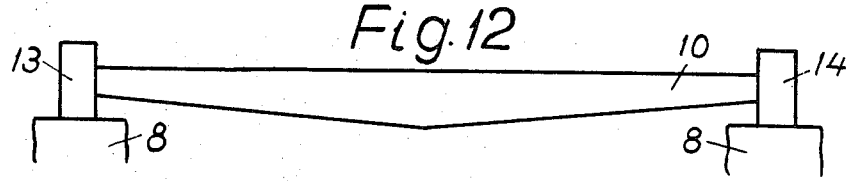

FIG. 12 shows a stop 11 applied in the lid of the reactor tank 2. When the reactor is in operation, the stops 11 should be able to take up deformation forces. In order to obtain a safe margin, these are dimensioned to suit the rupture limit of the beams 10.

A similar arrangement may be used for this latter alternative of the invention in connection with FIG. 7 as was made for the embodiment first described, except that the initial pressure in the latter case is effected by the pressure of the stops 11 on the beams 10 when the reactor lid 2 is placed in position.

With the help of an arrangement according to the invention, the steam treating unit is always kept stationary during normal operation and normal types of accidents.

The arrangement according to the invention is thus not limited to the embodiments shown. It can be varied in many ways within the scope of the accompanying claims.

I claim:

1. In a nuclear reactor having a reactor tank, a reactor tank lid and a steam treating unit comprising a moderator tank lid having steam separators attached thereto and a steam dryer unit, the steam dryer unit being arranged above the lid of the moderator tank, means for clamping the steam treating unit comprising members secured in the lid of the reactor tank for exerting a pressure on the steam treating unit for pressing it against the moderator tank when the lid is applied on the reactor tank.

2. In a nuclear reactor according to claim 1, said members comprising elastically deformable beams which are fixed at their ends to the reactor tank lid.

3. In a nuclear reactor according to claim 2, said beams together forming at least one polygonal formation.

4. In a nuclear reactor according to claim 2, said beams having greater cross-sectional area in their central sections than at their end portions.

5. In a nuclear reactor according to claim 1, said pressure being also sufficient to clamp the moderator tank to its stand.

6. In a nuclear reactor according to claim 1, a detachable joint attaching the steam dryer unit to the lid of the moderator tank.

7. In a nuclear reactor according to claim 1, said members being so dimensioned that the clamping pressure on the steam treating unit during normal operation of the reactor is greater than the forces which may arise from a normal type of accident.

8. In a nuclear reactor according to claim 1, the clamping means comprising elastically deformable members arranged above the steam dryer unit and deforming members in the reactor tank lid arranged to exert said pressure on said elastically deformable members.

9. In a nuclear reactor according to claim 8, said elastically deformable members comprising elastically deformable beams which are attached to the steam dryer unit at their ends.

10. In a nuclear reactor according to claim 9, said deforming members being located above the center of the beams.

11. In a nuclear reactor according to claim 9, said beams being arranged to form at least one polygonal formation.

12. In a nuclear reactor according to claim 9, said beams having greater cross-sectional area in their central section than near their ends.

* * * * *